United States Patent
Shannon et al.

(10) Patent No.: US 8,171,108 B2
(45) Date of Patent: *May 1, 2012

(54) SYSTEM AND METHOD FOR PROVIDING REMOTE FORENSICS CAPABILITY

(75) Inventors: Matthew M. Shannon, Tampa, FL (US); Matthew J. Decker, Valrico, FL (US)

(73) Assignee: Agile Risk Management LLC, Valrico, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/007,874

(22) Filed: Jan. 17, 2011

(65) Prior Publication Data

US 2011/0113139 A1     May 12, 2011

Related U.S. Application Data

(63) Continuation of application No. 12/046,101, filed on Mar. 11, 2008, now Pat. No. 7,899,882.

(60) Provisional application No. 60/920,773, filed on Mar. 29, 2007.

(51) Int. Cl.
*G06F 15/16* (2006.01)

(52) U.S. Cl. ........................................ 709/217; 709/224

(58) Field of Classification Search .................. 709/200, 709/217–219, 223–224, 227–228; 726/22, 726/26

See application file for complete search history.

(56) References Cited

U.S. PATENT DOCUMENTS

| | | | |
|---|---|---|---|
| 6,345,283 B1 | 2/2002 | Anderson | |
| 6,701,456 B1 * | 3/2004 | Biessener | 714/20 |
| 6,792,545 B2 | 9/2004 | McCreight et al. | |
| 7,016,951 B1 | 3/2006 | Longworth et al. | |
| 7,194,619 B2 | 3/2007 | Abbondanzio et al. | |
| 7,640,323 B2 | 12/2009 | Sun | |
| 2002/0129264 A1 | 9/2002 | Rowland et al. | |
| 2002/0162017 A1 | 10/2002 | Sorkin | |
| 2003/0208689 A1 | 11/2003 | Garza | |
| 2003/0236993 A1 | 12/2003 | McCreight et al. | |
| 2004/0177032 A1 | 9/2004 | Bradley et al. | |
| 2004/0260733 A1 | 12/2004 | Adelstein et al. | |
| 2005/0044244 A1 | 2/2005 | Warwick et al. | |
| 2005/0166082 A1 | 7/2005 | Williams et al. | |
| 2005/0216668 A1 | 9/2005 | Kobayashi et al. | |
| 2007/0168455 A1 | 7/2007 | Sun | |
| 2010/0299740 A1 * | 11/2010 | Sheldon et al. | 726/12 |
| 2011/0153748 A1 * | 6/2011 | Lee et al. | 709/205 |

* cited by examiner

*Primary Examiner* — Faruk Hamza (74) *Attorney, Agent, or Firm* — Jeffrey S. Melcher; Manelli Selter PLLC (57) ABSTRACT

A system and method for performing a forensic analysis of a subject computer having a non-volatile memory with a second computer is provided. In one embodiment, the method includes executing on the subject computer a first code segment configured to provide communications via a non-proprietary communication protocol such as the Internet Small Computer System Interface (iSCSI) protocol; establishing a connection between the second computer and the subject computer via the non-proprietary communication protocol. The non-proprietary communication protocol includes one or more write operations for writing data to a non-volatile memory in response to one or more write commands and the first code segment is configured to not write data to the non-volatile memory of the subject computer in response to receipt of the one or more write commands. The method may include performing a first forensic analysis of the subject computer via the connection. In addition, the method may further comprise establishing a secure connection, such via the Internet, between the second computer and a remote computer, wherein performing the first forensic analysis is initiated by the remote computer. A pre-defined forensic instruction set may be stored on the second computer and executed to perform the first forensic analysis.

24 Claims, 3 Drawing Sheets

SYSTEM AND METHOD FOR PROVIDING REMOTE FORENSICS CAPABILITY

CROSS REFERENCE TO RELATED APPLICATIONS

This application is a continuation of, and claims priority to, U.S. application Ser. No. 12/046,101, filed Mar. 11, 2008, now U.S. Pat. No. 7,899,882 which claims priority to U.S. Provisional Patent Application No. 60/920,773 filed Mar. 29, 2007, which are both incorporated herein by reference in their entirety for all purposes.

FIELD OF THE INVENTION

The present invention generally relates to systems and methods for conducting forensics services on a computing device, and more particularly to the remote collection, preservation, and analysis of computer-based evidence in the course of conducting a forensics or electronic discovery service.

BACKGROUND OF THE INVENTION

Forensics generally refers to "pertaining to or used in a court of law," and often relates to methods for obtaining evidence. Computer forensics is the systematic inspection of a computing device and its contents to collect, preserve and analyze data for possible use as evidence in a legal proceeding. Computer forensics typically is performed in a manner that adheres to the standards of evidence that are admissible in a court of law. Accordingly, specialized expertise and tools are used that go beyond the normal data collection and preservation techniques available to end-users or system support personnel.

The field of computer forensics maintains established practices which include processes and procedures for the collection, preservation, and analysis of data stored on computer systems. Application of these practices in conducting a digital forensics investigation upon a subject computer has historically required considerable time and effort from an experienced forensics practitioner. Accordingly, there is a need for faster, more cost effective methods of performing a forensics investigation.

There are many challenges to be overcome when providing forensic services, including for example the need to comply with evidentiary requirements of a court of law. Evidence must be unchanged and have a documented chain of custody. Accordingly, any viable forensics method needs to maintain the integrity of the evidence.

Another challenge to providing forensic services is gaining access to the computing device. The computing device may be used in an ongoing business enterprise and include sensitive data, which if made public could compromise legitimate business or personal interests. Another challenge is that of identifying computing devices which may have desired evidence. A large corporation may have hundreds, perhaps thousands of computers connected by various networks. Culpable data might be present only on relatively few computers, if any. Obtaining physical custody of all these computers could shut down a large enterprise, or otherwise damage legitimate ongoing business operations. Consequently, it is desirable to gain access to computing devices remotely.

Further, a computer forensic analysis may be a very time consuming and expensive process. Typically, the forensic practitioner takes custody of the subject computer, documents it, images it, analyses it, issues a report, and returns the computer to the customer. In many instances, this substantial effort may reveal that the computer has no desired evidence stored on it. Consequently, spending such a large effort (time and money) to determine whether or not evidentiary data is present (and is in need of preservation) on one computer often is not practical or economically feasible. Accordingly, there is a need for more cost effective forensic analyses.

Embodiments of the present invention address these and other challenges to provide an effective forensics service allowing secure, remote access to a subject computer, which may remain situated in its working environment.

BRIEF DESCRIPTION OF EXAMPLE EMBODIMENT OF THE INVENTION

The present invention provides a system and method for performing a forensic analysis of a subject computer having a non-volatile memory with a second computer. In one embodiment, the method includes executing on the subject computer a first code segment configured to provide communications via a non-proprietary communication protocol such as the Internet Small Computer System Interface (iSCSI) protocol; establishing a connection between the second computer and the subject computer via the non-proprietary communication protocol. The non-proprietary communication protocol includes one or more write operations for writing data to a non-volatile memory in response to one or more write commands and the first code segment is configured to not write data to the non-volatile memory of the subject computer in response to receipt of the one or more write commands. The method may include performing a first forensic analysis of the subject computer via the connection. In addition, the method may further comprise establishing a secure connection, such via the Internet, between the second computer and a remote computer, wherein performing the first forensic analysis is initiated by the remote computer. A pre-defined forensic instruction set may be stored on the second computer and executed to perform the first forensic analysis.

The invention will be better understood by reference to the following detailed description taken in conjunction with the accompanying drawings.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF ILLUSTRATIVE EMBODIMENTS

In the following description, for purposes of explanation and not limitation, specific details are set forth, such as particular networks, communication systems, computers, terminals, devices, components, techniques, storage devices, data and network protocols, software products and systems, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, computers, digital devices, storage devices, components, techniques, data and network protocols, software products and systems, development interfaces, operating systems, and hardware are omitted so as not to obscure the description of the present invention.

Overview

The field of computer forensics addresses acceptable processes and procedures for the collection, preservation, and analysis of computer-related evidence in the course of conducting a forensic analysis. The present invention significantly reduces the time required to perform forensics analyses by presenting a means to remotely enable the collection, preservation, and analysis process, thus removing the direct, on-site involvement of a forensics practitioner. Thus, the present invention significantly increases the efficiency and affordability of digital forensics investigations.

Throughout the specification, the terms subject computer and forensic analysis server are used. The term "subject computer" as used herein refers to the computer or computing device which is the subject of the forensic analysis (i.e., the computing device of which data is inspected or collected). The term "forensic analysis server" as used herein refers to a computer serving to assist in performing the forensic analysis of the subject computer. It is worth noting that the technical providers of forensics software and the forensic practitioners performing the forensic analysis may use alternate terminology. For example, providers of forensic systems may refer to the object of the investigation as the target computer, and the assisting computer as the subject computer. Thus, the term subject computer may have different meanings in the art and should be reviewed for its contextual meaning.

Figure 1:
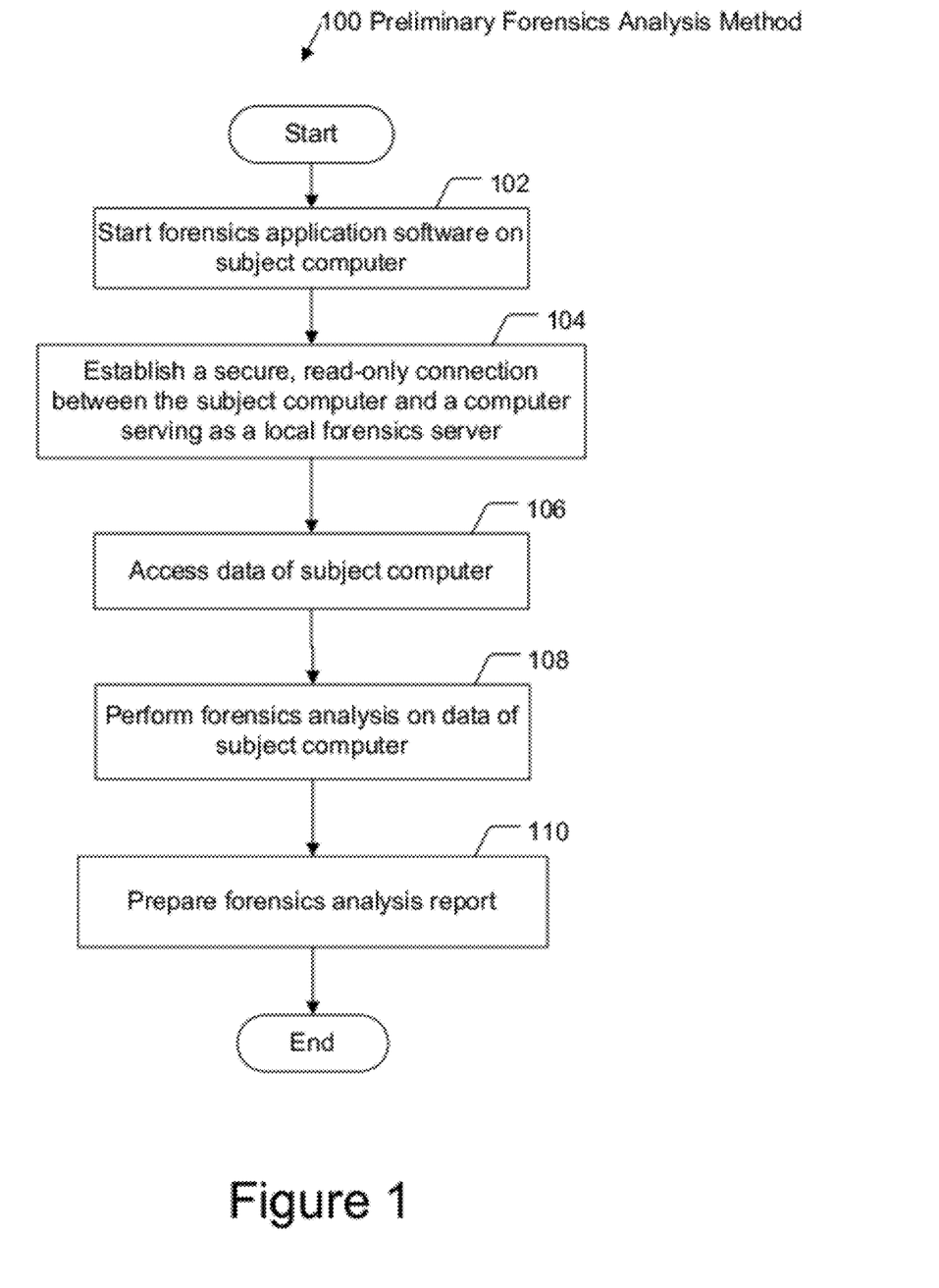
FIG. 1 is a flow chart of a preliminary forensics analysis method, according to an example embodiment of the present invention.

FIG. 1 shows steps of a method 100 for performing a preliminary forensics analysis on a subject computer according to an example embodiment of the present invention. The analysis may include identifying deleted items, internet history, email stores, registry data, recent mount points and other information obtainable from the subject computer. At step 102 the subject computer executes program code for facilitating the preliminary forensics analysis remotely. The program code may be an application residing on external media or on a storage device of the subject computer. For example, the subject computer may be booted from external media, such as a CD or a thumb drive that stores the code. Alternatively, the code may be stored on the hard drive on the subject computer as an application.

At step 104, a communication link is established between the subject computer and a local forensics analysis server (i.e., local to the subject computer) that includes one or more software tools for performing the forensic analysis. While the server may be local in that it is on the same network, it may be physically remote from the subject computer. In an example embodiment the communication link is a secure, read only connection in which the local forensics analysis server may read from the subject computer, but not write to the subject computer. The communication link may be implemented using one of various proprietary or non-proprietary communication protocols. In one embodiment, a non-proprietary communication protocol is used in which the program code executing on the subject computer (that facilitates communication via the protocol) is modified to prevent all write operations to non-volatile memory (initiated from the server) to thereby ensure that the memory of the subject computer is not altered by the forensics operation. At step 106, the data stored on the subject computer is accessed and analyzed by the local forensics analysis server. As discussed, the connection is read-only and, therefore, the forensics practitioner cannot—even inadvertently—alter data on the subject computer during the forensic service process.

At step 108, the forensics practitioner performs an analysis of the subject computer via the established communication link. Depending on the embodiment, the forensics practitioner may interact directly with the local forensics server, or may be in communication with the local forensics server remotely, such as via the internet or a network connection. The forensics practitioner may use established forensic analysis tools (e.g., resident on the server but operated remotely) to examine the contents of the subject computer. Because such tools are interacting with the subject computer through the read only communication link, the integrity of the data of the subject computer is maintained. In some embodiments, the forensic analysis is performed on the data as it resides on the subject computer and the hard drive of the subject computer need not be imaged. In another embodiment, the hard drive of the subject computer may be imaged (a copy of the raw data made) to the forensic server. In such an embodiment, the local forensics server, for the purpose of the investigation, serves as a mirror of the subject computer storage devices and the analysis is performed on the image copied to the forensic server. At step 110, a forensic report is generated by the server detailing the findings of the preliminary forensics analysis. The results of the preliminary forensic analysis may be used to determine whether additional, and more detailed, forensic analysis is warranted, which may include taking physical custody of the subject computer. While the above example describes performing the preliminary forensic analysis on only one subject computer, the present invention may be used to perform a preliminary forensic analysis on multiple subject computers concurrently by establishing multiple connections concurrently.

There are many benefits provided by some embodiments of the forensic system and method of the present invention. For example, the decision to conduct a preliminary forensics analysis on a subject computer is made easier because the analysis can be conducted at a fraction of the time and cost of non-remote services. Another benefit is that the forensic practitioner need not travel to the site of the subject computer to perform the forensic service. Physical access to the subject storage media may be replicated, as closely as possible, by remote access. In particular, preliminary analysis may be performed in a forensically sound manner without the need for drive imaging. As another benefit, the subject computer's owner need not forfeit physical control of the subject computer to enable the preliminary forensic analysis to be conducted. The preliminary analysis may be completed in just a few hours. Thus, the time required for an expensive forensic practitioner to conduct the service is minimized. In addition, because the forensic server (that includes the software tools for performing the forensic analysis) is located on the same (local) network as the subject computers (in some embodiments), the data on the subject computers never need leave the local network and be at risk. Next, in some embodiments the invention does not need special cabling (e.g., Fibre Channel) and can be connected via a TCP/IP connection. Finally, the invention facilitates the remote use of a variety of forensic software tools that otherwise do not have remote capabilities.

Remote Forensics Service Configuration

Figure 2:
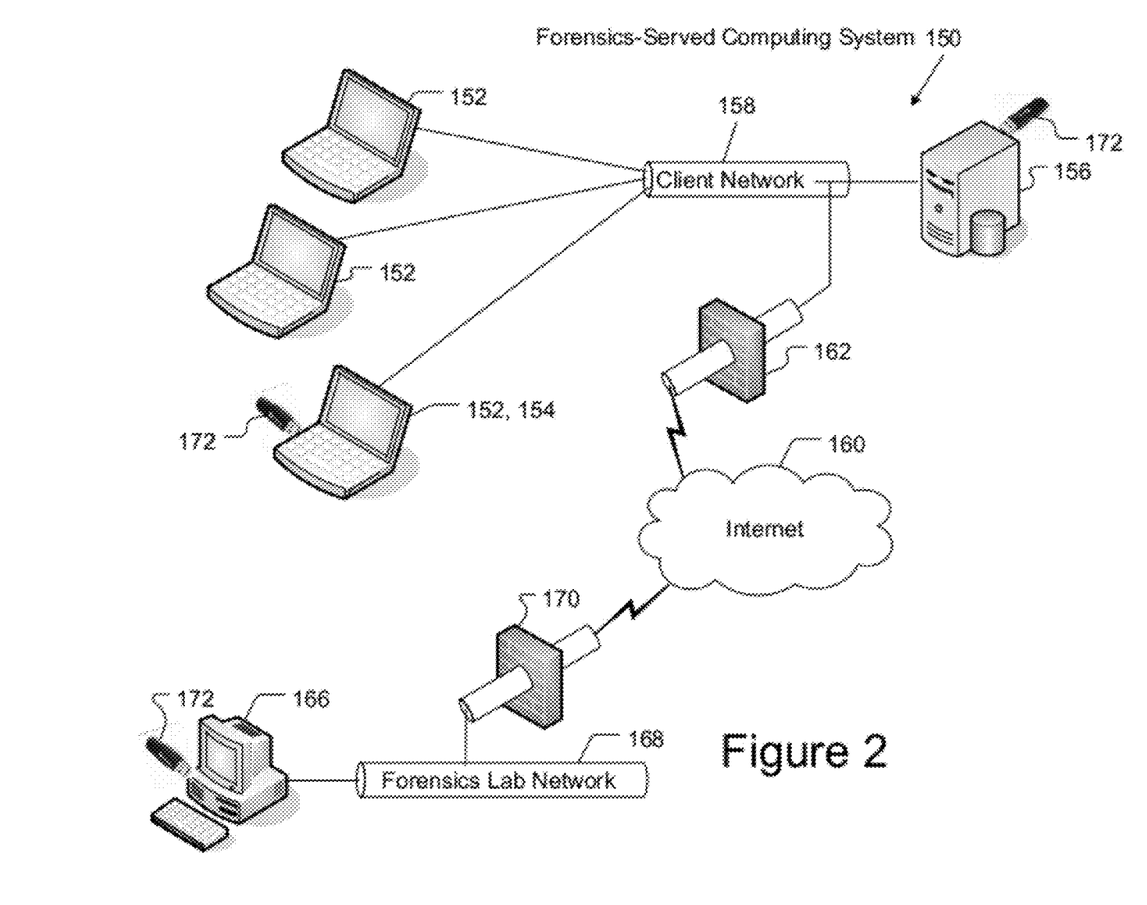
FIG. 2 is a block diagram of the configuration of an example remote forensics service system, according to an example embodiment of the present invention.

FIG. 2 shows the configuration of an example remote forensics service system 150 which may be used to provide remote forensic services, according to an example embodiment of the present invention. The computing system 150 may include one or more client devices 152 which may be the subject of a preliminary forensics analysis. A client computing device undergoing such a preliminary forensics analysis is referred to herein as a subject computer 154. Although the client computing device 152 is illustrated as a laptop computer, the client computing device 152 may be any computer, server, personal digital assistant, mobile telephone or other device having a processor for executing digital instructions and a memory for storing data.

The forensics system 150 also may include a forensics server 156 that may include one or more forensic software tools and which is capable of communicating with one or more subject computers 154. The local forensics server 156 may be a file server, web server, application server, workstation, laptop computer or other computer or server computer capable of communicating with the subject computers 154. The forensics server 156 also may be physically located near the subject computers 154 (e.g., in the same facility).

In an example configuration, the forensics server 156 and the subject computer 154 may form part of, and be connected to, a client network 158 implemented by the business enterprise for its employees. The client network 158 may comprise a local area network, or other network capable of implementing secure communications between the subject computer 154 and the forensics server 156. In some embodiments, devices within the client network 158 may access the internet 160 or another public or private wide area network or IP network in various manners, such as directly using a modem, or indirectly via a communication server or router. In some embodiments a firewall 162 may be implemented as a security precaution to protect the devices within the local area network 158.

The forensics practitioner may access the local forensics server 156 to remotely control the forensic software tools on the server 156 and perform the forensic analysis. The remote connection may include a link through the internet 160, or another public or private wide area network or IP network. In an example embodiment, the forensics practitioner operates a forensic computer 166 that communicates with the local forensics server 156 via the internet 160. For example, the forensics practitioner's computer 166 may form part of a forensics lab network 168. In some embodiments a firewall 170 may be implemented as a security precaution to protect the computer 166 and other devices within the forensics' lab network 168.

In some embodiments, a client of the forensics service may have many client devices 152 potentially serving as subject computers 154 to be analyzed. In some instances, it may be desirable to limit access to the various client devices 152 while administering a forensics service. For example, a digital key may be used to grant access to specific client devices 152 for the forensics processes allowing them to serve as subject computers 154. In an example embodiment, the digital key may be stored on a flash drive 172 which may plug into a USB port of a client device 152. When the flash drive with the embedded digital key is plugged into a client device 152, the digital key may be accessed by the software on the device 152 to allow access to the client device 152 to thereby serve as a subject computer 154. In some embodiments, a digital key may be used to unlock the entire client network 158. For example, by plugging a flash drive 172 having the embedded digital key into a USB port of the local forensics server 156 and activating the key, any client device 152 capable of communicating with the local forensics server 156 over a secure communication channel may serve as a subject computer 154.

Accordingly, in various embodiments, the entire client network 158 or specific client devices 152 within the client network 158 may be "unlocked" to be the subject of a preliminary forensics analysis.

In an alternative embodiment, the forensics computer 166 may serve as the forensic analysis server (i.e., execute the forensic software tools) and remotely communicate with the subject computers 154 without the local server 156 intervening in the forensics process. In such an embodiment, a digital key may be provided to the forensics practitioner enabling access to the client devices 152 on the client network 158. In an example embodiment, the digital key may be stored on a flash drive 172 which may plug into a USB port of forensic computer 166.

Preliminary Forensics Analysis Method

Figure 3:
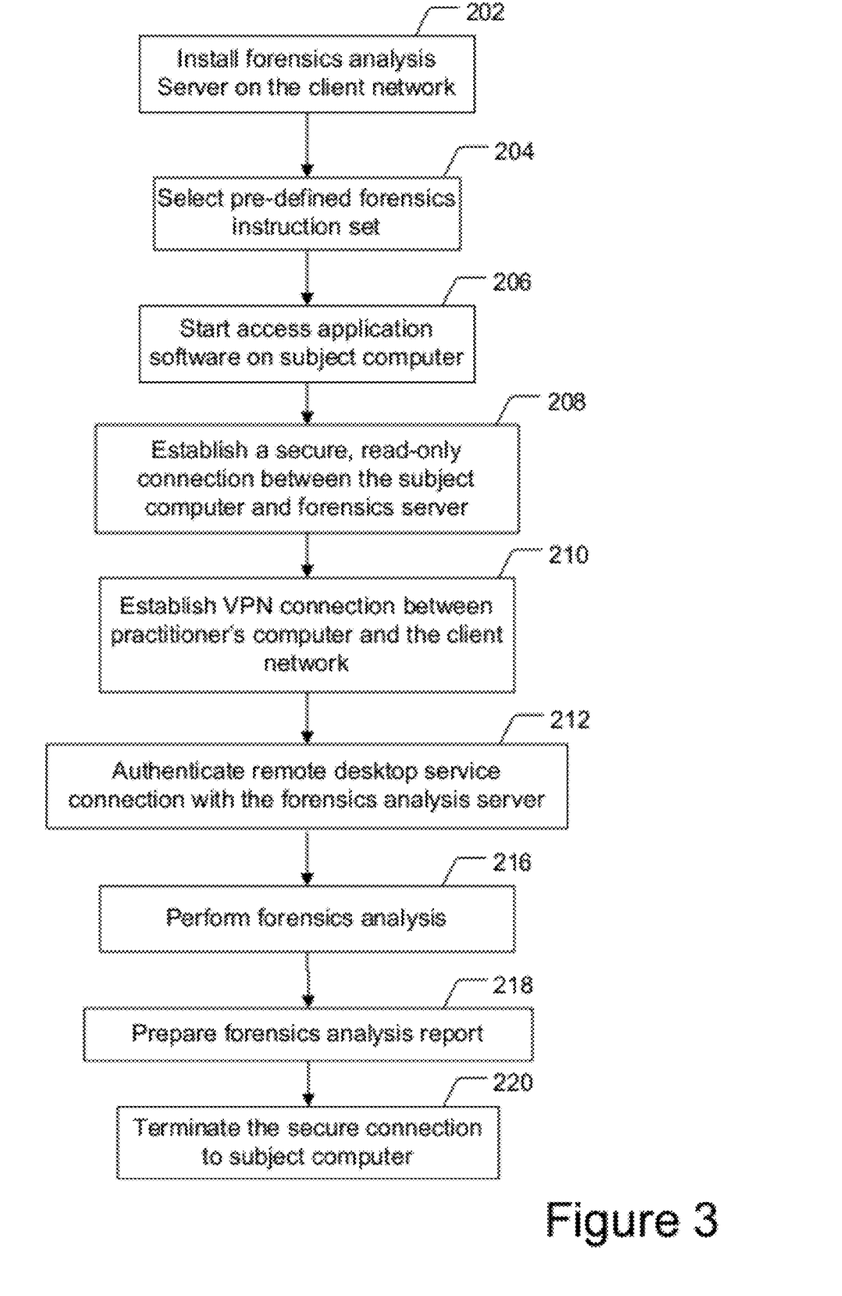
FIG. 3 is a flow chart of a preliminary forensics analysis method, according to another example embodiment of the present invention.

FIG. 3 illustrates a method of providing a remote forensics service to a client according to another example embodiment of the present invention. This method may be implemented with the configuration illustrated in FIG. 2. At step 202, a forensic analysis server 156 is installed on a client network 158. For example, a dedicated computer may be installed for the network. Alternatively application software embodying the forensics server capability may be installed on a client computer 152, such as a local network server. Such installation step may include gathering pertinent client information, establishing usage agreements, communicating instructions for use of the forensics service, and obtaining other relevant information, as appropriate. The forensics analysis server 156, for example, may be a Windows-based machine that can be accessed from a public communications network such as the Internet 160.

The local forensics analysis server 156 may execute various software for implementing the preliminary forensics analysis. For example, a USB to Ethernet Service may be implemented to authenticate and maintain digital keys and access external storage devices. A remote desktop service application may be executed to permit remote access and control by the authorized forensics practitioner. In an example embodiment, an iSCSI initiator code segment may be executed to manage communications between the local forensics analysis server 156 and the subject computer 154 during the live preliminary forensic analysis.

In addition, the server 156 may include one or more forensic software tools for analyzing the data from the subject computer. During the installation and setup operation, at step 204, a pre-defined forensics instruction set may be selected to define a level of forensic investigative effort to be expended on a subject computer 154. One of the fundamental aspects of the remote managed forensics service is efficiency, thus the pre-defined forensics instructions sets may be tailored to provide a rapid review of areas of interest. In this embodiment, the pre-defined instruction set is stored on, and executed by, the forensic server 156 (and is actuated from the forensic computer 166 by the forensic practitioner via the remote desktop service). In another embodiment, the pre-defined instruction set is stored on, and executed by, forensic computer 166 (in which configuration the server 156 may not be necessary).

At step 206, an access application is executed on the subject computer to allow the forensics server access to the data stored on the subject computer. In this example embodiment, iSCSI (Internet Small Computer System Interface), is used. iSCSI is a non-proprietary protocol that allows clients (called initiators) to send SCSI commands to SCSI storage devices (targets). iSCSI is a common Storage Area Network (SAN)

protocol, allowing organizations to consolidate storage into data center storage arrays while providing hosts (such as database and web servers) with the illusion of locally-attached disks. Unlike Fibre Channel, which requires special-purpose cabling, iSCSI can be run over long distances using existing network infrastructure.

As discussed, iSCSI initiator program code is executed on the forensic server 156. Modified iSCSI target program code is executed on the subject computer. A modified SCSI command interpreter is included as part of the modified target program code. The modified iSCSI target code executed by the subject computer 154 is configured to provide raw, read-only, authenticated access to the subject computer storage devices. Such code may reside on a CD and be accessed by the subject computer 154 by booting up from the CD. Alternatively, the code may reside on the subject computer 154 as an application program which may be executed transparent to a user of the subject computer 154.

At step 208, a secure, authenticated read only connection is established between the forensics server 156 and the subject computer 154 via the iSCSI protocol. The iSCSI connection between the forensics analysis server 156 and the subject computer 154 may be initiated by the forensics practitioner, for example, just prior to beginning the forensic analysis. In this example, the connection is established by the iSCSI Initiator program code executing on the forensic server 156. When established, the forensics server 156 "sees" the subject computer 156 hard drive (and other storage devices) over the client network 158 as one or more local physical drives. The connection provides raw access to the subject computer's hard drive and other storage devices for analysis from the forensics server 156.

As discussed, it is important that the data on the subject computer is not modified by the forensic process. In this example embodiment, the modified iSCSI target program code is modified from normal standard iSCSI target program code to ensure that the connection is a read only connection.

To implement the secure read only connection, the modified iSCSI target code executing on the subject computer 154 tallies the number of physical drives on the subject computer 154. For each physical disk (non-volatile memory) of the subject computer 154, the disk size and number of blocks is tallied and a file handle is opened specifying the following flags: GENERIC_READ; FILE_SHARE_READ; and FILE_SHARE_WRITE, which are flags used to enforce the read only requirement while allowing local write operations (e.g., initiated by the user of the subject computer or an application on the subject computer) (i.e., no remote write operations permitted while local write operations remain permitted). In this example and using this protocol, the GENERIC_READ handle specifies the only action that iSCSI target code can perform. The FILE_SHARE_READ and FILE_SHARE_WRITE handles set the sharing mode for the handle thereby allowing all other processes to continue to read and write to the disk.

In addition, after the connection is established the forensics analysis server 156 may send SCSI commands to the subject computer 154 to implement the forensics instruction set (e.g., commands originating from the forensics computer 166 and executed by forensics analysis tools executing on server 156). In one embodiment, the modified command interpreter will process the SCSI protocol's WRITE_6 and WRITE_10 commands differently than a normal (unmodified) SCSI command interpreter. In this example, for both the WRITE_6 command and the WRITE_10 command, the data that the server 156 is attempting to write to the subject computer 154 is stored in the subject computer's RAM buffer memory. The modified iSCSI target code on the subject computer 154 then transmits a status that indicates that the write was successful, (e.g., 0x01 meaning ALL_GOOD). However, the data written into the RAM buffer of the subject computer 154 is not written to the subject computer's hard drive, disk, or any non-volatile memory. The RAM buffer memory space is available for reuse allowing the data to be overwritten. Sequentially received data segments (e.g., of the same file) may be re-written to the same space in RAM. In summary, the modified iSCSI target program code ensures that no data is written to non-volatile memory of the subject computer 154. In other embodiments, the received write data may be discarded.

The connection also may be an authenticated connection. iSCSI initiators and targets may prove their identity to each other using the Challenge-Handshake Authentication Protocol (CHAP). Additionally, IPsec may be used at the network layer. Alternately, other authentication schemes may be used.

In other embodiments a secure, multi-factor authenticated and read-only network connection may be established between the local forensics analysis server 156 and the subject computer 154. Any unexpected commands (e.g., illegal write attempts; commands not among a prescribed set of permissible commands; commands from an unauthorized source) received at the subject computer 154 may be ignored.

Once the local forensics analysis server is installed, and the modified iSCSI target code is executing on the subject computer, the client network may be ready for implementation of a remote forensics service. At step 210, a forensics practitioner may establish a VPN connection between the forensic computer 166 and the client network 158 to secure communications over the internet 160. The forensics practitioner, for example, may be located in a forensics lab and remotely access the client network 158 using a computer 166 on the forensics lab's network 168. In some embodiments, this process (step 210) may be performed earlier such as just prior to step 204, 206, or step 208.

At step 212, the forensics practitioner may then authenticate a remote desktop service connection with the forensics analysis server 156 in order to conduct the forensics analysis.

At step 216, the forensics practitioner may start a preliminary forensics analysis. For example, the forensics practitioner may execute the pre-defined instructions set stored on the server 156 to perform a live analysis. Alternately, the forensics practitioner may select and execute various forensic analysis processes. More specifically, the forensics practitioner may conduct live analysis over the Internet 160, via the secure connection with the local forensics analysis server 156 on the client network 158, using proven, court-accepted forensics analysis tools and technology. The local forensics analysis server 156 receives the commands and generates requests sent to the subject computer 154. The forensics target code at the subject computer 154 may perform command interpretation operations to respond to the requests by transmitting data to the forensic server 156, which in turn transmits the data to the forensic computer 166. Any unexpected commands/requests (e.g., write operations) may be ignored or processed as described above. In some embodiments, the forensic server 166 may establish a connection with a plurality of subject computers 154 concurrently and the pre-defined forensic instruction set may be executed to perform a live analysis on each subject computer 154 concurrently.

At step 218, the results of the preliminary forensics analysis may be compiled into a report and supplied to the forensic computer. It is worth noting that in this embodiment, data of the subject computer 154 is provided only to the forensic server 156 and does not leave the local network 158 (e.g., does not pass the firewall 162). This fact enhances the security of the data for such embodiments. In addition, the data from the subject computers traverse only the local network, which typically has a greater throughput than Internet and other remote connections thereby allowing for a faster analysis. The forensics practitioner may conclude the preliminary forensics analysis by instructing the server 156 to terminate the iSCSI connection with the subject computer 154. The client may then be notified that the preliminary analysis of the subject computer 154 has been completed. The client may retrieve the preliminary forensics analysis report of the subject computer 154. For example, the forensics practitioner may store the report in a secure manner on the local forensics analysis server 156. Alternatively, the report may be stored in another secure location and made accessible to the client via a secure protocol. The client may elect to perform more thorough forensic analysis (which may include taking custody of the subject computer 152) or not, based on the preliminary forensic analysis report.

Accordingly, the modified iSCSI target program code running on the subject computer 154 may create a secure, authenticated and read only connection with the forensics analysis server 156, thus enabling forensically sound data collection and analysis of the subject computer 154. Forensic analysis operations then may be performed via an iSCSI connection between the subject computer 154 and the forensics server 156 over the client network 158. The forensic analysis operations may include, for example, one or more of the predefined instructions sets selected during installation. Remote forensic analysis and report generation may be performed from a remote location by communicating into the client network 158. While the above example embodiment employs iSCSI software and protocol, other embodiments may employ other non-proprietary and/or proprietary communication protocols, and associated modified (if necessary) software components.

Examples of the types of information that may be provided in a preliminary forensics analysis report, include but are not limited to the following:
  Subject computer identifying characteristics such as serial numbers and asset tags
  Subject computer BIOS and system parameters
  Email file stores (e.g. Outlook & Outlook Express; PST & DBX files)
    Complete content of all email messages, including headers.
    Full or partial collection of email messages and attachments
  Internet History Documentation
    Web sites visited
    Visit Dates & Times
  Internet Cache
    Including images and html text
  Deleted Files
    Complete listing of deleted files that are recoverable
    Meta data (e.g. Last Access Data/Time)
  Registry Data
    Complete listing of installed programs
    Run commands
    Mapped Network Drives
    Locations for certain log files
    Collection of selected passwords
  Office Documents
    Office Document meta-data for all detected office documents
    Retrieval of all or parts of office documents The following scenarios provide examples of how the remote forensic service methods may be used by a client:

A. Employee Investigation Scenario

The client has identified Steve in the Finance department as an individual that should be investigated. Steve is a laptop user. Steve brings the laptop to work, but does not leave it overnight. The business doesn't want Steve to know he is being investigated. The laptop may have the forensics target code already installed on the laptop computer. While the laptop is coupled to the client network 158, a preliminary forensics analysis may be performed to remotely profile and review Steve's laptop. In some embodiments, no overt indicators of activity occur. As a result, a typical user may not know when they are being investigated—even though the user may be using the computer during the live forensic analysis by the forensic practitioner. Therefore, the confidentiality of the investigation and the dignity of the position and individual can be maintained.

B. Incident Response Scenario

A main e-commerce web server appears to have been breached. It is difficult to tell what the hacker may have done, so it may be desirable to perform a preliminary forensics analysis. However, the e-commerce server is located in another state; cannot be brought offline; and there are no IT Security personnel there to assist. In this embodiment, the forensics target code does not require a reboot, and can be installed on critical servers without impacting uptime. The forensics target code may be configured to work with various RAID (Redundant Array of Independent/Inexpensive Disks) and logical drives. The forensics analysis service may trace, capture, and document the incident all via remote access.

C. eDiscovery Request

Legal advisors have informed the client that pending litigation discovery requests include collecting data from hundreds of laptops, workstations, and servers. This discovery must be done in house and with minimal disruption to business. In various embodiments, a forensics practitioner may use any of various tools, such as the eDiscovery, Computer Forensic, or Data Recovery Software packages. Such tools may be executed from the forensics' practitioners computer 166. The forensics practitioner may access subject computers 154 coupled to the client network 158 for keyword and data searches without adversely impacting operations.

D. Lost File Recovery

A mobile workforce sales professional accidentally deleted a critical presentation on their laptop. They are on the road and need the file recovered. There are no IT support personnel available in that location and the presentation is imminent. In some embodiments, many data recovery applications may be run from a remote location, (e.g., from the forensic practitioner's computer 166). In this scenario, the sales professional may log onto the client network 158, allowing authorized personnel, (such as a forensics practitioner or another authorized user) to physically address the laptop's hard drive for read operations. Thus, the file may be recovered and emailed or otherwise transferred to the laptop. The forensics service allows recovery of the file. Conventional means may then be used to allow the sales professional to access the recovered file.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, steps and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A method of performing a forensic analysis of a first computer having a non-volatile memory with a second computer, comprising:
    executing on the first computer a first program code configured to provide communications via a non-proprietary communication protocol;
    executing on the second computer a second program code configured to provide communications via the non-proprietary communication protocol;
    establishing a connection between the second computer and the first computer via the non-proprietary communication protocol; wherein the non-proprietary communication protocol operates in accordance with a non-proprietary communication protocol standard that includes one or more write commands for writing data to a non-volatile memory; wherein the first program code is configured to respond to at least one non-proprietary protocol command in accordance with the non-proprietary communication protocol standard; wherein the first program code is configured to not write data to the non-volatile memory of the first computer in response to receiving the one or more write commands of the non-proprietary communication protocol standard; and wherein the non-proprietary communication protocol comprises an Internet Small Computer System Interface (iSCSI) protocol, or any Small Computer System Interface (SCSI) protocol communication exchanged over a network via HTTPS;
    performing a first forensic analysis of the first computer via the connection; and
    outputting a report based on the first forensic analysis.

2. The method according to claim 1, wherein the first program code is configured to tally a number of physical disk drives of the first computer;
    wherein said first program code is configured to determine a disk size for each physical disk drive, and
    wherein said first program code is configured to determine a number of blocks of each disk drive.

3. The method according to claim 1, wherein the first program code is configured to write data to a volatile memory in response to receiving at least one of the one or more write commands.

4. The method according to claim 1, wherein the connection comprise an IP/TCP connection.

5. The method according to claim 4, wherein the connection includes a communication path that includes the Internet.

6. The method according to claim 1, further comprising:
    storing a pre-defined forensic instruction set in a memory of the second computer; and
    wherein said performing the first forensic analysis comprises executing the forensic instruction set.

7. The method according to claim 1, wherein the non-proprietary communication protocol comprises an Internet Small Computer System Interface (iSCSI) protocol.

8. The method according to claim 1, wherein the first program code is configured to open a file handle for a non-volatile memory and to specify one or more flags; and
    wherein none of the one or more flags permit a remote write operation.

9. The method according to claim 8, wherein at least one of the one or more flags permits a local write operation.

10. The method according to claim 1, wherein the report includes information of three or more from the group of: Email files stored on the first computer, web sites visited with the first computer, listing of deleted files that are recoverable on the first computer, meta-data for detected documents on the second computer, and a listing of installed programs on the first computer.

11. A computer program product, comprising one or more computer usable media having a computer readable program code embodied therein, said computer readable program code adapted to be executed by a first computer and a second computer to implement a method of performing a forensic investigation of the first computer having a non-volatile, non-transitory, memory with the second computer, the computer program product comprising: a first code segment for execution by the first computer; a second code segment for execution by the second computer; wherein the first code segment and said second code segment are executable to establish a connection between the first computer and the second computer via a non-proprietary communication protocol; wherein the non-proprietary communication protocol operates in accordance with a non-proprietary communication protocol standard that includes one or more write commands for writing data to a non-volatile, non-transitory, memory wherein the first code segment is executable to respond to a plurality of commands in accordance with the non-proprietary communication protocol standard; wherein the first code segment is executable to not write data to the non-volatile, non-transitory, memory in response to receiving the one or more write commands of the non-proprietary communication protocol standard; and wherein the non-proprietary communication protocol comprises an Internet Small Computer System Interface (iSCSI) protocol, or any Small Computer System Interface (SCSI) protocol communication exchanged over a network via HTTPS; and wherein the second code segment is executable to perform a first forensic analysis of the first computer via the connection.

12. The computer program product according to claim 11, wherein said first code segment is configured to tally a number of physical disk drives of the first computer;
    wherein said first code segment is configured to determine a disk size for each physical disk drive, and
    wherein said first code segment is configured to determine a number of blocks of each disk drive.

13. The computer program product according to claim 11, wherein said first code segment is configured to write data to a volatile memory in response to receiving at least one of the one or more write commands.

14. The computer program product according to claim 11, wherein the connection comprise an IP/TCP connection.

15. The computer program product according to claim 11, wherein the non-proprietary communication protocol comprises an Internet Small Computer System Interface (iSCSI) protocol.

16. The computer program product according to claim 11, wherein said first code segment is configured to open a file handle for a non-volatile memory and to specify one or more flags; and
    wherein none of the one or more flags permit a remote write operation.

17. The computer program product according to claim 16, wherein at least one of the one or more flags permits a local write operation.

18. The computer program product according to claim 11, wherein the second code segment is executable to output a report based on the first forensic analysis; and     wherein said report includes data of three or more from the group of: Email files stored on the first computer, web sites visited with the first computer, listing of deleted files that are recoverable on the first computer, meta-data for detected documents on the first computer.

19. A method of performing a forensic analysis of a first computer having a non-volatile, non-transitory, memory with a second computer, comprising:

executing a first program code on the first computer; and     establishing a connection between the second computer and the first computer via a communication protocol; wherein the communication protocol operates in accordance with a communication protocol standard that includes a first write command for writing data to a non-volatile, non-transitory, memory; wherein the first program code is configured to respond to at least one command in accordance with the communication protocol standard; wherein in response to receiving the first write command, the first program code is configured to write data to volatile non-transitory memory and to not write data to non-volatile, non-transitory, memory; and wherein the non-proprietary communication protocol comprises an Internet Small Computer System Interface (iSCSI) protocol, or any Small Computer System Interface (SCSI) protocol communication exchanged over a network via HTTPS; performing a first forensic analysis of the first computer via the connection with the second computer; and outputting a report based on the first forensic analysis.

20. The method according to claim 19, wherein said first program code is configured to tally a number of physical disk drives of the first computer,     wherein said first program code is configured to determine a disk size for each physical disk drive, and     wherein said first program code is configured to determine a number of blocks of each disk drive.

21. The method according to claim 19, wherein the connection comprise an IP/TCP connection.

22. The method according to claim 19, wherein the communication protocol comprises an Internet Small Computer System Interface (iSCSI) protocol.

23. The method according to claim 19, wherein the first program code is configured to open a file handle for a non-volatile memory and to specify one or more flags; and     wherein none of the one or more flags permit a remote write operation.

24. The method according to claim 19, wherein said report includes data of three or more from the group of: Email files stored on the first computer, web sites visited with the first computer, listing of deleted files that are recoverable on the first computer, meta-data for documents on the second computer, and a listing of installed programs on the first computer.

\* \* \* \* \*